US010635039B2

(12) United States Patent
Ikeda

(10) Patent No.: US 10,635,039 B2
(45) Date of Patent: Apr. 28, 2020

(54) IMAGE FORMING APPARATUS AND FAILURE POINT ESTIMATION METHOD

(71) Applicant: KONICA MINOLTA, INC., Tokyo (JP)

(72) Inventor: Makoto Ikeda, Hachioji (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 16/169,614

(22) Filed: Oct. 24, 2018

(65) Prior Publication Data
US 2019/0129342 A1 May 2, 2019

(30) Foreign Application Priority Data
Oct. 26, 2017 (JP) ................................. 2017-206757

(51) Int. Cl.
G03G 15/00 (2006.01)
G06T 7/00 (2017.01)
G03G 15/01 (2006.01)

(52) U.S. Cl.
CPC ..... *G03G 15/5062* (2013.01); *G03G 15/0131* (2013.01); *G03G 15/5079* (2013.01); *G03G 15/55* (2013.01); *G03G 15/553* (2013.01); *G03G 15/556* (2013.01); *G06T 7/001* (2013.01); *G03G 15/5016* (2013.01); *G06T 2207/30144* (2013.01)

(58) Field of Classification Search
CPC ....... G03G 15/5068; G03G 2215/0067; G03G 15/5062
See application file for complete search history.

(56) References Cited

U.S. PATENT DOCUMENTS 8,632,071 B2 * 1/2014 Inoue .................... G03G 15/70
271/265.02

FOREIGN PATENT DOCUMENTS

| JP | 2005352448 A | * | 12/2005 | ......... G03G 15/6564 |
| JP | 2008225377 A | * | 9/2008 | |
| JP | 2011087285 A | | 4/2011 | |
| JP | 2014006336 A | | 1/2014 | |

OTHER PUBLICATIONS

Adachi et al. (JP 2008-225377 A), Sep. 2008, JPO Computer Translation (Year: 2008).*

* cited by examiner

*Primary Examiner* — Erika J Villaluna
(74) *Attorney, Agent, or Firm* — Buchanan Ingersoll & Rooney PC

(57) ABSTRACT

An image forming apparatus, including: an image former; a sheet detection sensor; an image reader; and a hardware processor that: detects an image abnormality by analyzing the read image data and obtains a position in a sheet conveyance direction of the detected image abnormality in the read image data for each piece of the read image data corresponding to each of the sheets; estimates a conveyance interval of the plurality of sheets based on a detection result by the sheet detection sensor, and determines whether a specific periodicity exists based on the estimated conveyance interval and the position of the image abnormality detected from the read image data corresponding to each of the sheets; and when the specific periodicity is determined to exist, estimates a part corresponding to the specific periodicity as a failure point.

13 Claims, 8 Drawing Sheets

FIG.3

| CANDIDATE NUMBER | PART | PERIOD | SENSOR USED |
|---|---|---|---|
| 1 | PHOTOSENSITIVE DRUM | 251mm | FIRST SHEET DETECTION SENSOR |
| 2 | DEVELOPPING SLEEVE | 44mm | FIRST SHEET DETECTION SENSOR |
| 3 | FIXING BELT | 377mm | SECOND SHEET DETECTION SENSOR |

| COLORED STREAK/ WHITE STREAK | SHEET NUMBER | SHEET CONVEYANCE DIRECTION POSITION |
|---|---|---|
| | | |
| | | |
| | | |
| | | |
| | | |

| COLORED SPOT/ WHITE SPOT | SHEET NUMBER | SHEET CONVEYANCE DIRECTION POSITION | SHEET WIDTH DIRECTION POSITION |
|---|---|---|---|
| | | | |
| | | | |
| | | | |
| | | | |
| | | | |

T3

IMAGE FORMING APPARATUS AND FAILURE POINT ESTIMATION METHOD

BACKGROUND

Technological Field

The present invention relates to an image forming apparatus and a failure point estimation method.

Description of the Related Art

In electrophotographic image forming apparatuses, image abnormalities may occur due to the failure of parts relating to the electrophotographic process in some cases. For example, there are cases where a photosensitive drum which is a part relating to the developing process is damaged and generates streaks or a lack in the image. With respect to this, a test image is formed on the sheet, and read image data obtained by reading the test image is analyzed to detect image abnormalities. In order to solve the generation of image abnormalities, it is desirable to identify the failure point from the analysis result of the read image data.

As a method for identifying the failure point, there is a method of analyzing whether same image abnormalities periodically occur in the conveyance direction (sub-scanning direction) of the sheet. The electrophotographic image forming apparatus has many parts which convey the sheet or the image by rotating rotation bodies, and image abnormalities possibly occur at intervals of the rotation periods of the respective parts. For example, in a case where the image abnormalities occur due to the photosensitive drum being damaged, when the diameter of the photosensitive drum is 80 mm, the image abnormalities occur at intervals of approximately 251 mm. In this case, if the generation interval of the image abnormalities is found to be 251 mm from the analysis result of the read image data, it is possible to estimate that the failure point is the photosensitive drum.

Some of the parts which possibly cause the image abnormalities have periods which are longer than the length in the conveyance direction of the sheet size which is generally used. In a case of such a part, it is not possible to obtain read image data sufficient for analysis of the periods of the image abnormalities from only a single sheet. In a case of the image forming apparatus having the photosensitive drum with the outer circumference of 251 mm as described above, when the sheet of A3 size is used, the length in the conveyance direction of the sheet is 420 mm. Thus, the image abnormality of 251 mm period only appears at one or two points in one sheet. Accordingly, in order to raise the accuracy of period analysis, it is desirable to obtain as long data in the sheet conveyance direction as possible.

Thus, there is considered a method of performing analysis by continuously outputting a plurality of sheets on which the test image is formed and handling the read image data of the plurality of sheets as data which is continuous in the sheet conveyance direction. When handling the data which is continuous in the sheet conveyance direction, it is necessary to consider the distance (distance between sheets) from the rear end of one sheet to the front end of the next sheet. The theoretical value of the distance between sheets can be generally calculated from the printing speed for each sheet size.

For example, for an apparatus that continuously prints a test image on a plurality of sheets and that detects density irregularities in the sub-scanning direction from the measurement data obtained by optically reading the plurality of sheets, there is suggested a technique connecting the measurement data of each sheet with an interval corresponding to the distance between sheets (see JP 2011-87285 (A) and JP 2014-6336 (A)).

However, actually, the sheet is not necessarily conveyed at the distance between sheets as in the theoretical value due to the influence of variation in the sheet conveyance timing and the like. For example, when the sheets are handled on the sheet feeding tray and supplied one by one, the sheet may slip on the sheet feeding roller and the sheet conveyance timing may be shifted in some cases. In such a case, if the analysis is performed by assuming that the sheet is conveyed with the distance between sheets as in the theoretical value, it is not possible to accurately obtain the generation interval of the image abnormalities. Specifically, even when the image abnormalities actually occur at the period of 251 mm corresponding to the photosensitive drum, there is a possibility that the period cannot be accurately detected due to the gap of the theoretical value of the distance between sheets and the actual variation. There is also considered a method of providing a margin to the distance between sheets and comparing the interval between image abnormalities with the period corresponding to each part. However, the accuracy is lowered by the amount of the margin. In a case of providing the margin, though the range of variation needs to be grasped in advance, the range of variation is different also for the type of the sheet feeding unit. Thus, it is not easy to set an appropriate margin.

SUMMARY

The present invention has been made in view of above problems in conventional techniques, and an object of the present invention is to determine the periodicity of image abnormalities without being influenced by variation in the sheet conveyance timing.

To achieve at least one of the abovementioned objects, according to an aspect of the present invention, an image forming apparatus reflecting one aspect of the present invention includes an image former that forms a predetermined image on a plurality of sheets which are continuously conveyed; a sheet detection sensor that is provided on a sheet conveyance path and detects a passing timing of each of the plurality of sheets; an image reader that reads sheet surfaces of the plurality of sheets on which the predetermined image is formed, and that generates read image data corresponding to each of the sheets; and a hardware processor that: detects an image abnormality by analyzing the read image data and obtains a position in a sheet conveyance direction of the detected image abnormality in the read image data for each piece of the read image data corresponding to each of the sheets; estimates a conveyance interval of the plurality of sheets based on a detection result by the sheet detection sensor, and determines whether a specific periodicity exists based on the estimated conveyance interval and the position of the image abnormality detected from the read image data corresponding to each of the sheets; and when the specific periodicity is determined to exist, estimates a part corresponding to the specific periodicity as a failure point.

To achieve at least one of the abovementioned objects, according to an aspect of the present invention, a failure point estimation method reflecting one aspect of the present invention includes forming a predetermined image on a plurality of sheets which are continuously conveyed by an image former; detecting a passing timing of each of the plurality of sheets by a sheet detection sensor that is provided on a sheet conveyance path; reading sheet surfaces of the plurality of sheets on which the predetermined image is formed and generating read image data corresponding to each of the sheets by an image reader; detecting an image abnormality by analyzing the read image data, and obtaining a position in a sheet conveyance direction of the detected image abnormality in the read image data, for each piece of the read image data corresponding to each of the sheets; estimating a conveyance interval of the plurality of sheets based on a detection result by the sheet detection sensor, and determining whether a specific periodicity exists based on the estimated conveyance interval and the position of the image abnormality detected from the read image data corresponding to each of the sheets; and when the specific periodicity is determined to exist, estimating a part corresponding to the specific periodicity as a failure point.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, and wherein:

FIG. 3 is a view showing an example of a failure point candidate table;

FIG. 4 is a view showing an example of a streak information table;

FIG. 5 is a view showing an example of a spot-like dirt information table;

DETAILED DESCRIPTION OF EMBODIMENTS

Hereinafter, one or more embodiments of the present invention will be described with reference to the drawings. However, the scope of the invention is not limited to the disclosed embodiments.

[First Embodiment]

First, a first embodiment of the image forming apparatus according to the present invention will be described. The present invention is not limited to the illustrated examples.

Figure 1:
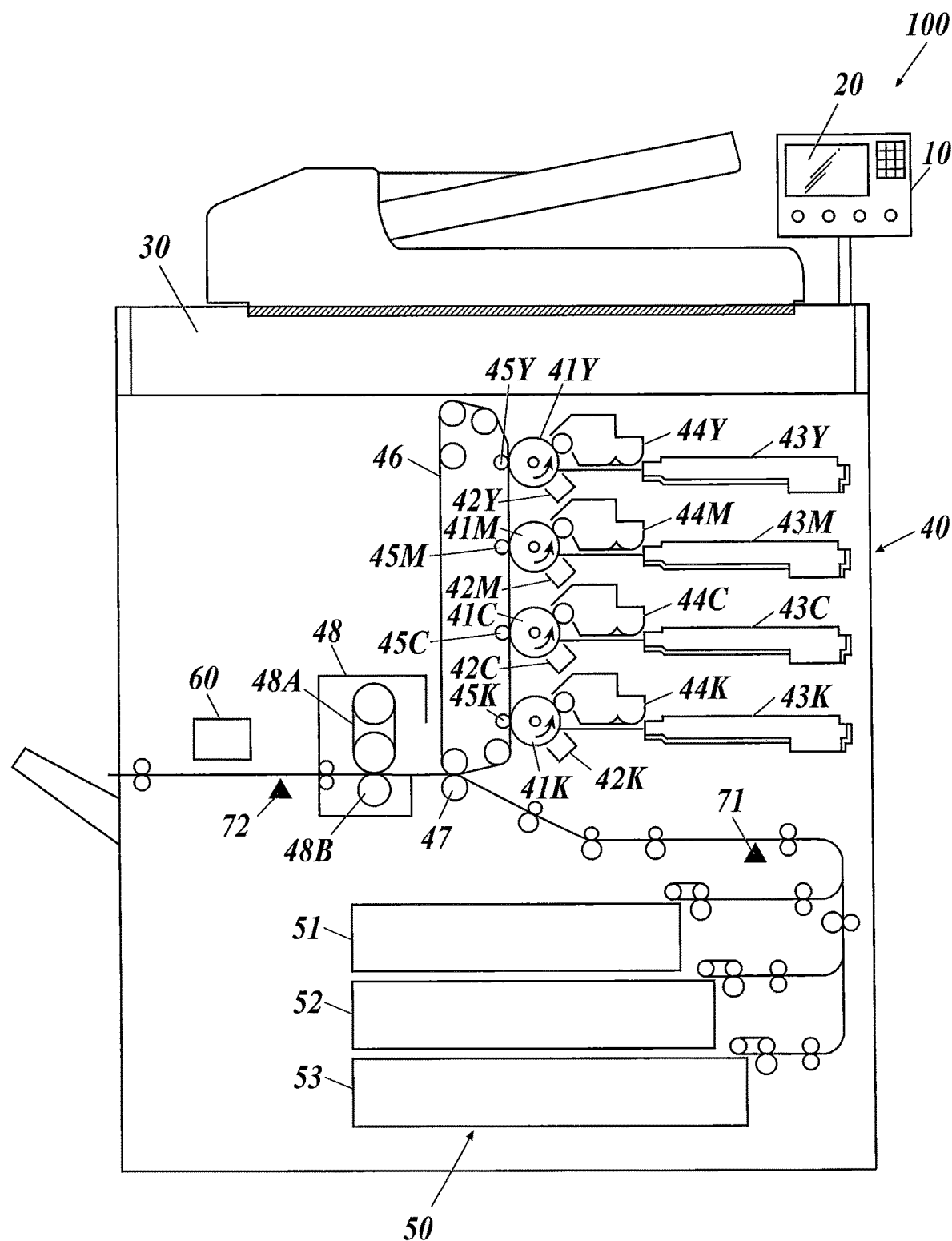
FIG. 1 is a schematic configuration view of an image forming apparatus in a first embodiment of the present invention.

FIG. 1 is a schematic configuration view of an image forming apparatus 100 in the first embodiment.

The image forming apparatus 100 is an image forming apparatus which forms a color image by the electrophotographic method on the basis of image data obtained by reading the image from a document or image data which was received from an external device.

The image forming apparatus 100 includes an operation section 10, a display 20, a document reading unit 30, an image former 40, a sheet feeder 50, an image reader 60, a first sheet detection sensor 71, a second sheet detection sensor 72 and the like.

Figure 2:
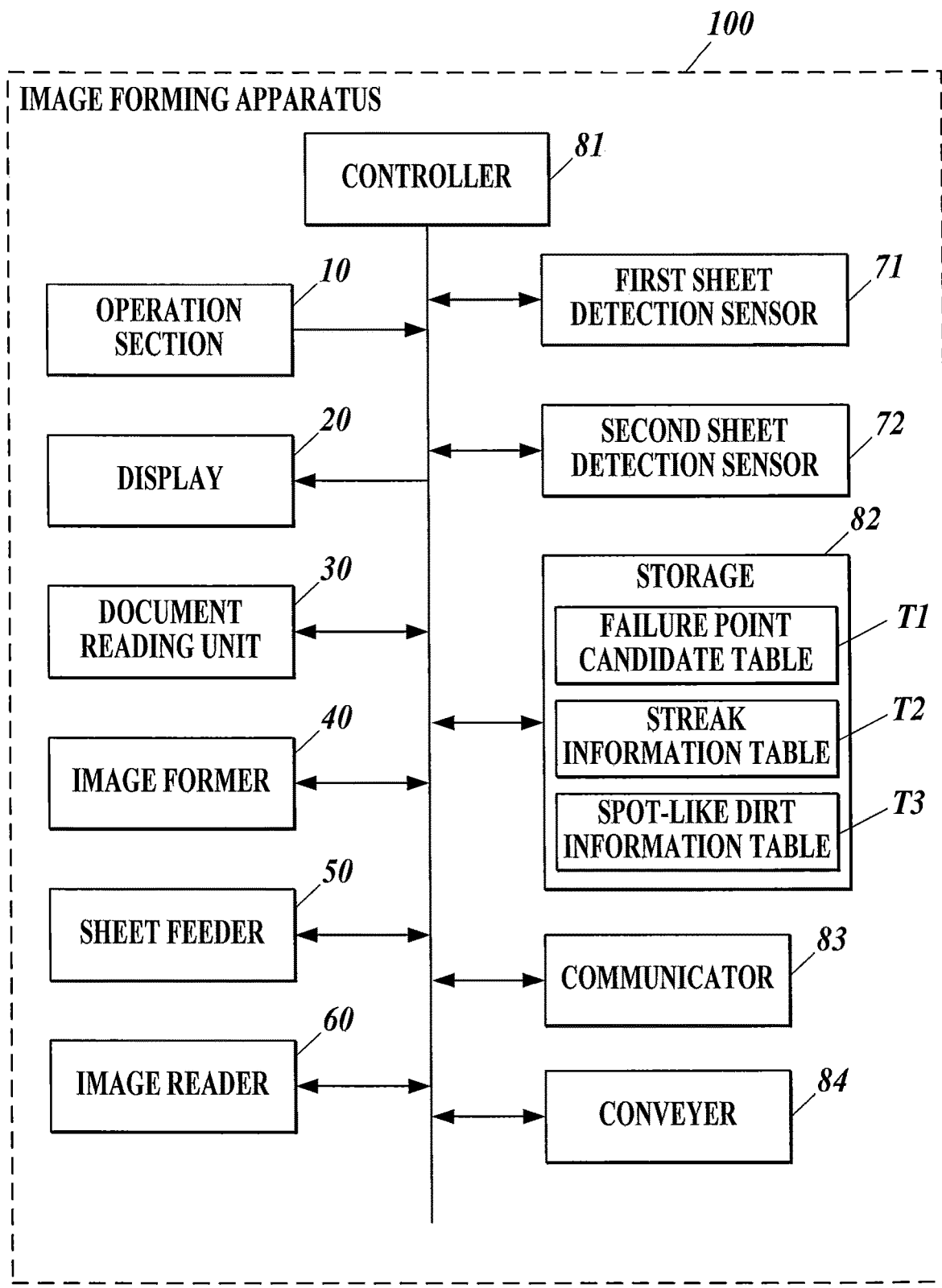
FIG. 2 is a block diagram showing a functional configuration of the image forming apparatus.

The operation section 10 includes a touch panel which is formed to cover the display screen of the display 20 and various types of operation buttons such as numeric buttons and a start button, and outputs an operation signal based on user's operation to the controller 81 (see FIG. 2).

The display 20 is configured by including an LCD (Liquid Crystal Display), and displays various types of screens in accordance with the instruction of the display signal input from the controller 81.

The document reading unit 30 includes an ADF (automatic document feeding device), a scanner or the like, and outputs image data obtained by reading the image on the document to the controller 81.

The image former 40 forms the image on a sheet supplied from the sheet feeder 50.

The image former 40 includes photosensitive drums 41Y, 41M, 41C and 41K, chargers 42Y, 42M, 42C and 42K, exposure sections 43Y, 43M, 43C and 43K, developers 44Y, 44M, 44C and 44K and primary transfer rollers 45Y, 45M, 45C and 45K for respective colors of yellow (Y), magenta (M), cyan (C) and black (K). The image former 40 includes an intermediate transfer belt 46, a secondary transfer roller 47, a fixer 48 and the like.

A yellow toner image is formed on the photosensitive drum 41Y. The charger 42Y uniformly charges the photosensitive drum 41Y. The exposure section 43Y forms an electrostatic latent image by performing scanning exposure of the surface of the photosensitive drum 41Y with laser beams on the basis of the yellow component of image data for the image formation. The developer 44Y attaches toners to the electrostatic latent image on the photosensitive drum 41Y and performs developing. The primary transfer roller 45Y transfers the toner image formed on the photosensitive drum 41Y onto the intermediate transfer belt 46 (primary transferring).

The same applies to each section corresponding to magenta, cyan and black except for that the color (toner) to be treated is different.

The toner images formed on the photosensitive drums 41Y, 41M, 41C and 41K are sequentially transferred onto the intermediate transfer belt 46. The secondary transfer roller 47 transfers the toner images formed on the intermediate transfer belt 46 onto the sheet (secondary transferring).

The fixer 48 includes a fixing belt 48A which heats the sheet on which the toner images were transferred, and a pressure roller 48B which applies a pressure to the sheet. The fixer 48 fixes the toner images on the sheet by heating and applying the pressure. When the sheet enters the fixer 48, since the speed of sheet is controlled to make the loop of the front end of the sheet appropriate before fixing, the interval of sheets to be fixed varies. In addition, the ejection timing of the sheet from the fixer 48 varies by the sheet slipping on the fixing belt 48A or the pressure roller 48B that contacts the sheet at the time of fixing. Due to these causes, the sheet conveyance interval varies around the fixer 48.

In the failure point estimation processing (see FIG. 6), the image former 40 forms a predetermined image on a plurality of sheets which are conveyed continuously. Specifically, the image former 40 forms a test image having a density of a predetermined medium tone as the predetermined image. If an image of a uniform tone which is approximately 50% is formed on the entire surfaces of the sheets as the test image, the image abnormalities appear markedly, and thus, it is easy to detect the image abnormalities.

The sheet feeder 50 includes the sheet feeding trays 51 to 53, the sheet feeding roller and the like, and supplies the sheet to the image former 40. Each of the sheet feeding trays 51 to 53 contains the sheets of a sheet type and a size which are determined in advance for the sheet feeding tray. When the sheets are handled and supplied one by one by the sheet feeding roller from each of the sheet feeding trays 51 to 53, the sheet slips on the sheet feeding roller, the sheet conveyance timing is shifted and the sheet conveyance interval varies.

The image reader 60 is provided downstream of the image former 40 on the sheet conveyance path. The image reader 60 reads the sheet surfaces of the plurality of sheets on which the predetermined image was formed, generates read image data corresponding to each of the sheets and outputs the read image data to the controller 81. The image reader 60 is a color sensor that receives, with the light receiving elements, light which was emitted from the light source and reflected on the sheet surface and outputs a signal corresponding to the intensity of light. The image reader 60 is configured by including a line sensor in which a plurality of light receiving elements are arranged at predetermined intervals in the sheet width direction orthogonal to the sheet conveyance direction.

Each of the first sheet detection sensor 71 and the second sheet detection sensor 72 is provided on the sheet conveyance path and detects the passing timing of each of the sheets. For example, each of the first sheet detection sensor 71 and the second sheet detection sensor 72 detects the passing timing of the front end in the conveyance direction of the sheet. Hereinafter, the first sheet detection sensor 71 and the second sheet detection sensor 72 are also described as the sheet detection sensors 71 and 72 in some cases.

The first sheet detection sensor 71 is provided downstream of the sheet feeder 50 and upstream of a nip section formed by the intermediate transfer belt 46 and the secondary transfer roller 47 on the sheet conveyance path. The first sheet detection sensor 71 is a sensor for determining the image creation timing in the processes of charging, exposure, developing and transferring (primary transferring and secondary transferring). The variance of sheet conveyance interval due to the sheet feeding and handling by the sheet feeder 50 is reflected on the output signal of the first sheet detection sensor 71.

The second sheet detection sensor 72 is provided near and downstream of the fixer 48 on the sheet conveyance path. The variance of the sheet conveyance interval caused by a part around the fixer 48 is reflected on the output signal of the second sheet detection sensor 72.

FIG. 2 is a block diagram showing the functional configuration of the image forming apparatus 100.

As shown in FIG. 2, the image forming apparatus 100 includes an operation section 10, a display 20, a document reading unit 30, an image former 40, a sheet feeder 50, an image reader 60, a first sheet detection sensor 71, a second sheet detection sensor 72, a controller 81, a storage 82, a communicator 83, a conveyer 84 and the like. The description regarding the functional sections already described is omitted.

The controller 81 is configured by including a CPU (Central Processing Unit), a ROM (Read Only Memory), a RAM (Random Access Memory) and the like. The CPU reads out various processing programs stored in the ROM, loads them to the RAM and integrally controls the operations of the components of the image forming apparatus 100 in accordance with the loaded programs, in response to the operation signal input from the operation section 10 or the instruction signal received from the communicator 83.

The storage 82 is configured by including a non-volatile storage device such as a hard disk and flash memory, and stores various types of data. For example, the storage 82 stores a failure point candidate table T1. The storage 82 stores a streak information table T2 and a spot-like dirt information table T3 as image abnormality information.

FIG. 3 shows an example of the failure point candidate table T1. The failure point candidate table T1 stores the candidate number, the part, the period and the sensor used such that they are correlated with each other.

The "candidate number" field stores the number (candidate number) corresponding to each part to be a candidate of the failure point.

The "part" field stores the name of each part to be a candidate of the failure point.

The "period" field stores the period (interval) of image abnormalities generated by each part to be a candidate of the failure point.

The "sensor used" field stores, for the candidate of the failure point, information indicating the sheet detection sensor (first sheet detection sensor 71 or the second sheet detection sensor 72) to be used when determining a periodicity of the image abnormalities. For example, the first sheet detection sensor 71 is used when determining the periodicity of image abnormalities generated due to a part included in the photosensitive drums 41Y, 41M, 41C and 41K, chargers 42Y, 42M, 42C and 42K, exposure sections 43Y, 43M, 43C and 43K, developers 44Y, 44M, 44C and 44K, primary transfer rollers 45Y, 45M, 45C and 45K, intermediate transfer belt 46 and the secondary transfer roller 47. On the other hand, the second sheet detection sensor 72 is used when determining the periodicity of image abnormalities generated due to a part included in the fixer 48.

FIG. 4 shows an example of the streak information table T2. The streak information table T2 stores the colored streak/white streak, the sheet number and the sheet conveyance direction position such that they are correlated with each other.

The "colored streak/white streak" field stores information indicating whether the detected streaky image abnormality is a colored streak having a density higher than that of the surrounding portion or a white streak having a density lower than that of the surrounding portion.

The "sheet number" field stores the identification number (sheet number) for identifying the sheet on which the streaky image abnormality was detected. The sheet number is a number indicating what number of sheet was detected among a plurality of sheets which are continuously output.

The "sheet conveyance direction position" field stores information indicating the position in the sheet conveyance direction (sub-scanning direction) of the image abnormality in the read image data of the sheet on which the streaky image abnormality was detected.

FIG. 5 shows an example of the spot-like dirt information table T3. The spot-like dirt information table T3 stores the colored spot/white spot, the sheet number, the sheet conveyance direction position and the sheet width direction position such that they are correlated with each other.

The "colored spot/white spot" field stores information indicating whether the detected spot-like image abnormality (spot-like dirt) is a colored spot having a density higher than that of the surrounding portion or a white spot having a density lower than that of the surrounding portion.

The "sheet number" field stores the identification number (sheet number) for identifying the sheet on which the spot-like image abnormality was detected.

The "sheet conveyance direction position" field stores information indicating the position in the sheet conveyance direction (sub-scanning direction) of the image abnormality in the read image data of the sheet on which the spot-like image abnormality was detected.

The "sheet width direction position" field stores information indicating the position in the sheet width direction (main scanning direction) of the image abnormality in the read image data of the sheet on which the spot-like image abnormality was detected.

The communicator 83 performs transmission and reception of data with an external device connected via the communication network such as a LAN (Local Area Network). For example, the communicator 83 transmits the estimated failure point to a server which is connected via the communication network, in such a manner that the estimated failure point and the identification information of the image forming apparatus 100 are correlated with each other.

The conveyer 84 includes a conveyance roller for conveying the sheet. The conveyer 84 supplies the sheet contained in the sheet feeding tray of the sheet feeder 50 to the image former 40 and conveys the sheet in the image forming apparatus 100 until the sheet after image formation is conveyed to the sheet ejection tray.

The controller 81 determines the image creation timing in the processes of the charging, exposure, developing and transferring on the basis of the detection result by the first sheet detection sensor 71. That is, the interval of images (for example, interval from the image of the front end portion of a sheet to the image of the front end portion of the next sheet) corresponding to each of the sheets which are formed in the processes of the charging, exposure, developing and transferring and are conveyed continuously is equivalent to that obtained by converting the interval (time) of the passing timing of each sheet detected by the first sheet detection sensor 71 into the distance.

For each piece of read image data that is corresponding to each sheet, the controller 81 analyzes the read image data to detect the image abnormality, and obtains the position in the sheet conveyance direction of the image abnormality which was detected in the read image data.

For example, the controller 81 detects a streaky (including linear type and band type) image abnormality along the sheet width direction orthogonal to the sheet conveyance direction from the read image data corresponding to each sheet. At this time, the controller 81 detects the streaky image abnormality in such a manner of distinguishing whether the streak is a colored streak having a density higher than that of the surrounding portion or a white streak having a density lower than that of the surrounding portion. A plurality of streaks generated by a same cause is generated as a same type of streaks (colored streaks or white streaks).

The controller 81 detects a spot-like image abnormality from the read image data corresponding to each sheet, and obtains the position in the sheet width direction orthogonal to the sheet conveyance direction in addition to the position in the sheet conveyance direction of the spot-like image abnormality detected in the read image data. At this time, the controller 81 detects the spot-like image abnormality in such a manner of distinguishing whether the image abnormality is a colored spot having a density higher than that of the surrounding portion or a white spot having a density lower than that of the surrounding portion.

The controller 81 estimates the conveyance intervals of the plurality of sheets on the basis of the detection results by the first sheet detection sensor 71 or the second sheet detection sensor 72, and determines whether there is a specific periodicity on the basis of the estimated conveyance intervals and the position in the sheet conveyance direction of the image abnormality detected from the read image data corresponding to each sheet. The controller 81 determines whether there is a periodicity corresponding to a part for each of a plurality of parts which are candidates of the failure point.

Specifically, as for the streaky image abnormalities, the controller 81 determines whether there is a specific periodicity on the basis of the positions in the sheet conveyance direction of the colored streaks or white streaks.

As for the spot-like image abnormalities, the controller 81 determines whether there is a specific periodicity on the basis of the positions in the sheet conveyance direction of colored spots or of white spots located at the same position in the sheet width direction. The spot-like image abnormalities generated periodically in the sheet conveyance direction by a same cause are located at a same position in the sheet width direction. For example, in a case where spot-like image abnormalities are generated in central portions in the sheet width direction, in order to check whether the image abnormalities are generated at a specific period, it is sufficient to target only the spot-like image abnormalities detected from the central portions of the sheets.

If it is determined that there is a specific periodicity, the controller 81 estimates the part corresponding to the specific periodicity as the failure point.

For example, the controller 81 determines a part relating to the process of the charging, exposure, developing or transferring as the failure point from the periodicity of image abnormalities determined on the basis of the sheet conveyance intervals estimated from the detection results of the first sheet detection sensor 71.

The controller 81 estimates a part included in the fixer 48 as the failure point from the periodicity of image abnormalities determined on the basis of the sheet conveyance intervals estimated from the detection results of the second sheet detection sensor 72.

The controller 81 causes the display 20 to display the estimated failure point.

The controller 81 uploads the estimated failure point to the server connected via the communication network such that the estimated failure point is correlated with the identification information of the image forming apparatus 100.

The server is a computer device which is connected via the communication network with the image forming apparatus 100 and other image forming apparatuses, and managed by a management company which performs service and maintenance of each image forming apparatus. The server includes a storage device for storing the failure point transmitted from each image forming apparatus and the identification information of the image forming apparatus which is the transmission source such that they are correlated with each other.

Next, the operation in the image forming apparatus 100 in the first embodiment will be described.

Figure 6:
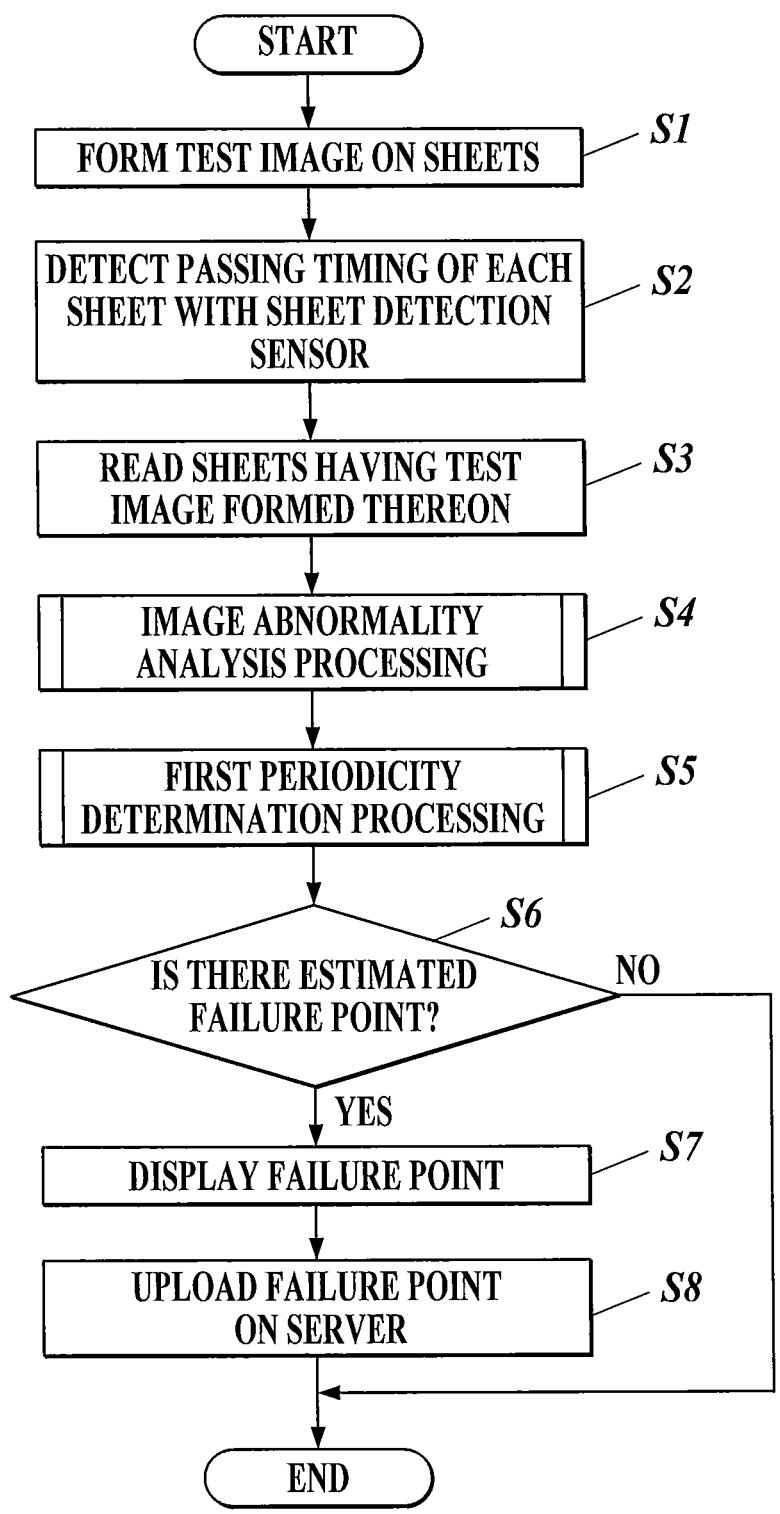
FIG. 6 is a flowchart showing failure point estimation processing executed in the image forming apparatus.

FIG. 6 is a flowchart showing failure point estimation processing executed in the image forming apparatus 100. This processing is achieved by software processing in cooperation between the CPU of the controller 81 and the program stored in the ROM.

First, the controller 81 controls the image former 40 and the conveyer 84 to form a test image on a plurality of sheets while continuously conveying the plurality of sheets (step S1). For example, the controller 81 causes the image former 40 to form an image of a medium tone density of approximately 50% of black on the entire surfaces of the A3 size sheets for consecutive three sheets.

The controller 81 causes the first sheet detection sensor 71 and the second sheet detection sensor 72 to detect the passing timing of each sheet when forming the test image (step S2). The controller 81 causes the storage 82 to store the detection result of the passing timing of each sheet for each sheet detection sensor of the first sheet detection sensor 71 and the second sheet detection sensor 72.

Next, when the test image is formed, the controller 81 controls the image reader 60 to read the sheet surfaces of the plurality of sheets on which the test image is formed, to generate read image data corresponding to each of the sheets (step S3). The controller 81 causes the storage 82 to store the read image data corresponding to each sheet.

Next, the controller 81 executes image abnormality analysis processing (step S4). The image abnormality analysis processing is processing of analyzing the read image data for each piece of read image data corresponding to each sheet to detect the image abnormality and obtaining the position of the image abnormality in the read image data.

Figure 7:
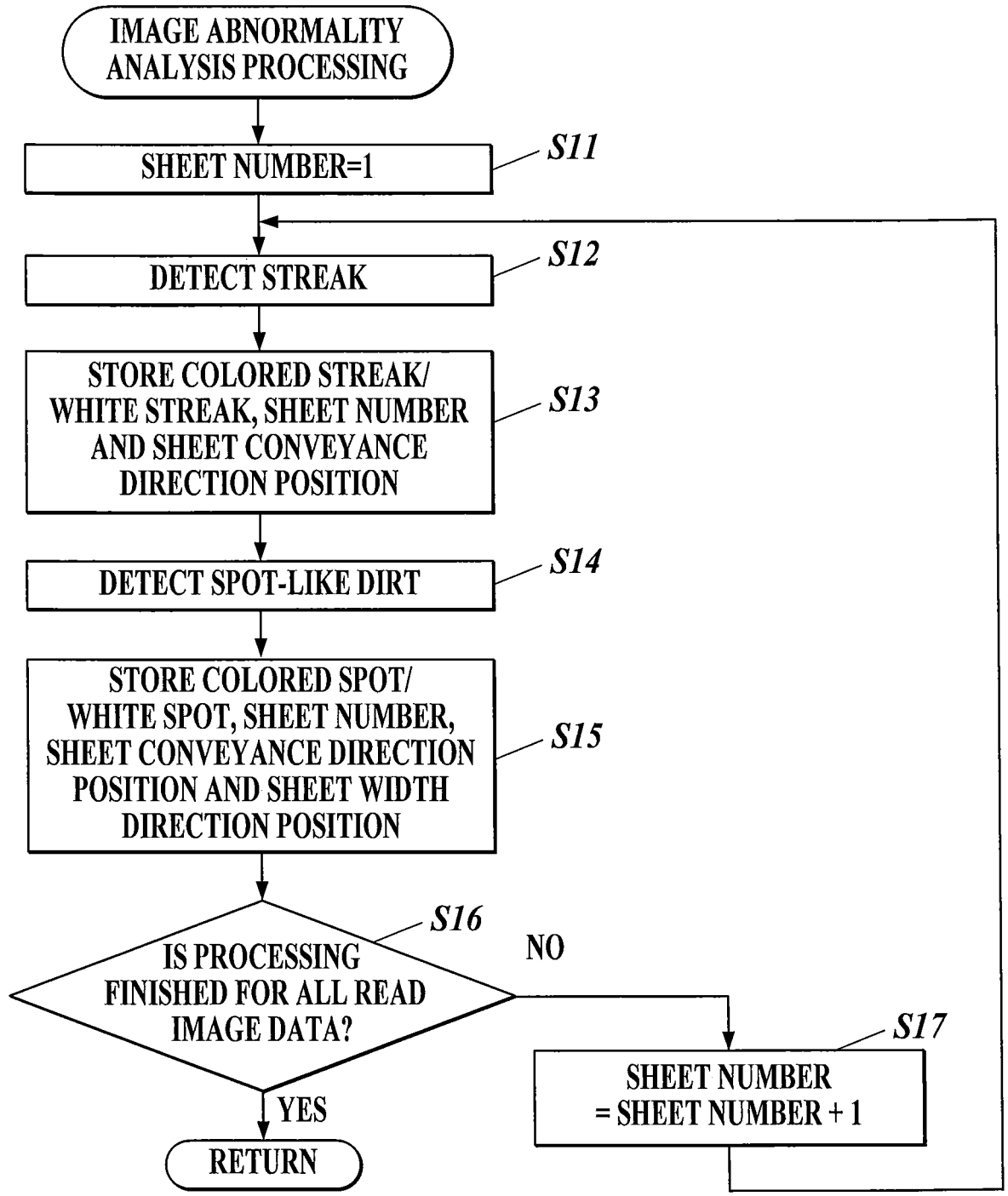
FIG. 7 is a flowchart showing image abnormality analysis processing.

Here, with reference to FIG. 7, the image abnormality analysis processing will be described.

The controller 81 sets the sheet number of the sheet to be the processing target to 1 (step S11).

Next, the controller 81 reads out the read image data corresponding to the sheet indicated by the sheet number from the storage 82, analyzes the read image data which was read and detects the streaky image abnormality (streak) along the sheet width direction (step S12). For example, the controller 81 obtains the average value of the pixel values in the sheet width direction (main scanning direction) for each position of the sheet conveyance direction (sub-scanning direction) of the read image data which is the analysis target, creates profile data of the sheet conveyance direction, detects a peak from the profile data in the sheet conveyance direction and obtains the position (coordinate) of the streak in the sheet conveyance direction. At this time, the controller 81 performs the detection such that whether the streak is a colored streak or a white streak is distinguished.

Next, the controller 81 stores the distinction of whether the detected streak is a colored streak or a white streak, the sheet number and the position in the sheet conveyance direction in the streak information table T2 of the storage 82 such that they are correlated with each other (step S13).

Next, the controller 81 analyzes the read image data corresponding to the sheet indicated by the sheet number and detects a spot-like image abnormality (spot-like dirt) (step S14). For example, on the basis of the read image data of the analysis target, the controller 81 detects the region where the density (pixel value) is largely different from the surrounding portion as the spot-like dirt and obtains the position in the sheet conveyance direction and the position in the sheet width direction of the spot-like dirt. At this time, the controller 81 performs the detection such that whether the spot is a colored spot or a white spot is distinguished.

Next, the controller 81 stores the distinction whether the detected spot-like dirt is a colored spot or a white spot, the sheet number, the position in the sheet conveyance direction and the position in the sheet width direction in the spot-like dirt information table T3 of the storage 82 such that they are correlated with each other (step S15).

Next, the controller 81 determines whether the processing is finished for all the pieces of read image data (step S16).

If there is read image data for which processing is not finished (step S16; NO), the controller 81 adds 1 to the sheet number (step S17), and returns to step S12 to repeat the processing.

In step S16, if the processing is finished for all the pieces of read image data (step S16; YES), the image abnormality analysis processing ends.

Next, returning to FIG. 6, the controller 81 executes the first periodicity determination processing (step S5). The first periodicity determination processing is processing of determining whether there is a specific periodicity on the basis of the position of image abnormality detected from the read image data corresponding to each sheet.

Here, with reference to FIG. 8, first periodicity determination processing will be described.

The controller 81 sets the candidate number corresponding to the part of the periodicity determination target to 1 (step S21). Hereinafter, the part corresponding to the candidate number is referred to as a candidate part.

Next, the controller 81 refers to the failure point candidate table T1 stored in the storage 82 and obtains the period and the sensor to be used corresponding to the candidate part (step S22).

Next, the controller 81 obtains the detection results of the sensor to be used corresponding to the candidate part (first sheet detection sensor 71 or second sheet detection sensor 72) from the storage 82 (step S23). For example, in a case where the photosensitive drums 41Y, 41M, 41C and 41K are set as a candidate part, the controller 81 obtains the detection result of the first sheet detection sensor 71 from the storage 82.

Next, the controller 81 estimates the conveyance intervals of the plurality of sheets at the time of formation of the test image on the basis of the detection results of the first sheet detection sensor 71 or the second sheet detection sensor 72 obtained in step S23 (step S24). Specifically, the controller 81 converts the time from the passing of the front end of one sheet to the passing of the front end of the next sheet into the distance (sheet conveyance interval) from the front end of the one sheet to the front end of the next sheet on the basis of the output signal of the first sheet detection sensor 71 or the second sheet detection sensor 72.

Next, the controller 81 extracts image abnormality information considered to have a same cause (step S25). For example, the controller 81 extracts the sheet numbers and the positions in the sheet conveyance direction of the image abnormalities detected as colored streaks from the streak information table T2 of the storage 82. The controller 81 extracts the sheet numbers and the positions in the sheet conveyance direction of the image abnormalities detected as white streaks from the streak information table T2 of the storage 82. The controller 81 extracts the sheet numbers and the positions in the sheet conveyance direction of the image abnormalities detected as colored spots having a same position in the sheet width direction from the spot-like dirt information table T3 of the storage 82. The controller 81 extracts the sheet numbers and the positions in the sheet conveyance direction of the image abnormalities detected as white spots having a same position in the sheet width direction from the spot-like dirt information table T3 of the storage 82.

Next, the controller 81 calculates the distance between the image abnormalities on the basis of the sheet conveyance intervals estimated in step S24 and the image abnormality information (sheet numbers and the positions in the sheet conveyance direction) extracted in step S25 (step S26).

Next, the controller 81 determines whether there is a periodicity corresponding to the candidate part in generation of the image abnormalities on the basis of the distance between the image abnormalities calculated in step S26 and the period corresponding to the candidate part obtained in step S22 (step S27).

If there is a periodicity corresponding to the candidate part in generation of the image abnormalities (step S27; YES), the controller 81 estimates the candidate part as the failure point (step S28).

In step S27, if there is no periodicity corresponding to the candidate part in generation of the image abnormalities (step S27; NO), or after step S28, the controller 81 determines whether the processing is finished for all the failure point candidates (step S29).

If there is any failure point candidate for which the processing is not finished (step S29; NO), the controller 81 adds 1 to the candidate number (step S30), and returns to step S22. Then, the controller 81 repeats the processing for the next part as the periodicity determination target.

In step S29, if the processing is finished for all the failure point candidates (step S29; YES), the first periodicity determination processing ends.

In the first periodicity determination processing, whether there is a periodicity of image abnormalities is determined for all the parts which are candidates of the failure point. For example, as shown in FIG. 3, in a case where there are set three types of parts that are "photosensitive drum", "developing sleeve" and "fixing belt" as a failure point candidate, and the periods of the parts are respectively "251 mm", "44 mm" and "377 mm", the periodicity is determined for all the periods corresponding to the three types of parts. In some cases, the generation of image abnormalities is detected at respective periods of the "photosensitive drum" and the "fixing belt", and the "photosensitive drum" and the "fixing belt" are estimated as the failure points. In such a case, the "photosensitive drum" and the "fixing belt" are the targets of the maintenance.

Next, returning to FIG. 6, the controller 81 determines whether there is an estimated failure point (step S6). If there is any estimated failure point (step S6; YES), the controller 81 causes the display 20 to display the estimated failure point (step S7).

Next, the controller 81 correlates the estimated failure point with the identification information of the image forming apparatus 100 and uploads the estimated failure point to the server via the communicator 83 (step S8). In the server, the failure point transmitted from the image forming apparatus 100 and the identification information of the image forming apparatus 100 are stored such that they are correlated with each other.

In step S6, if there is no estimated failure point (step S6; NO), or after step S8, the failure point estimation processing ends.

Figure 9:
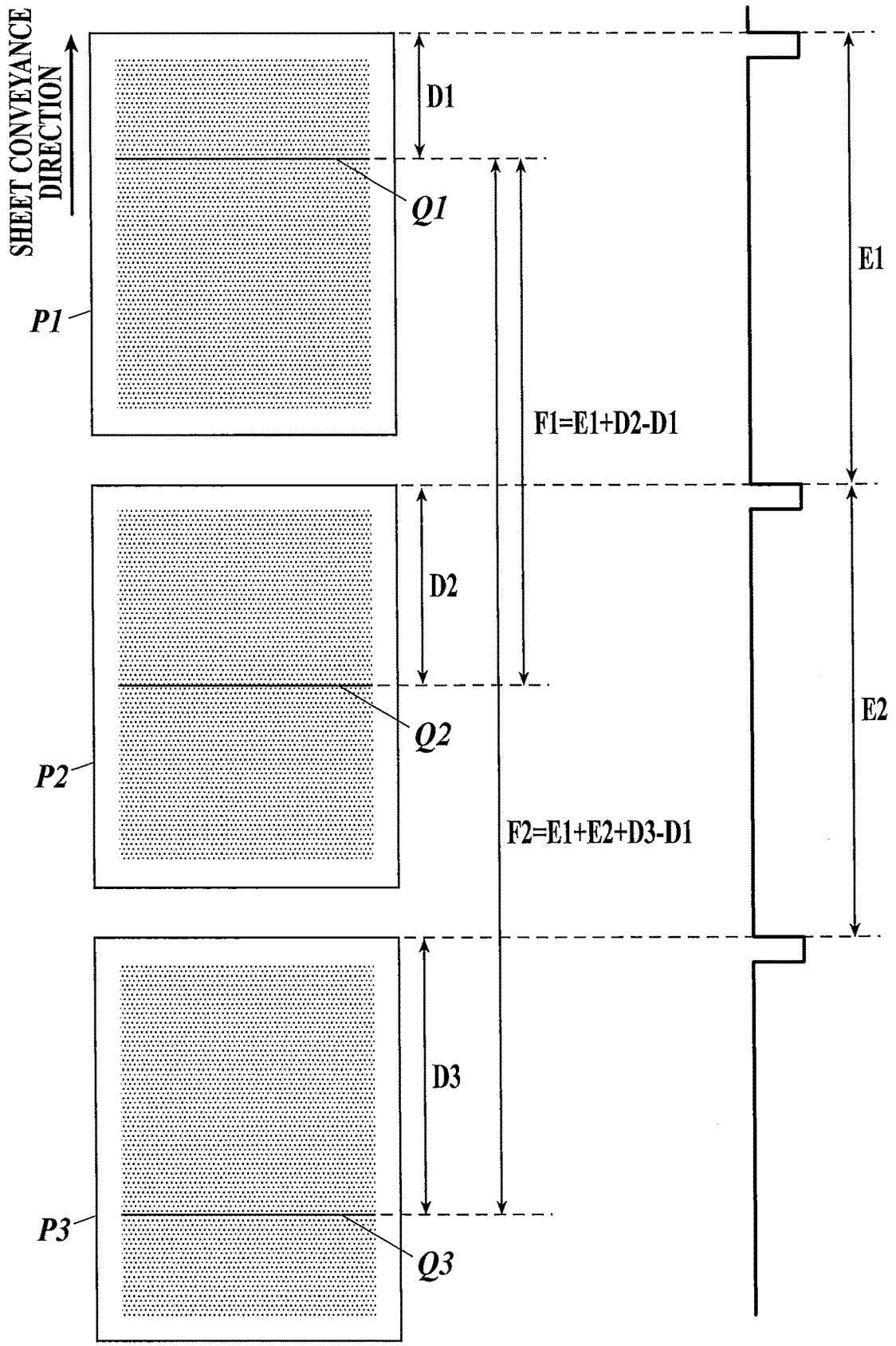
FIG. 9 is a view for explaining a calculation method of the distance between streaks.

Next, with reference to FIG. 9, the description will be made regarding the calculation method of the distance between streaks in a case where the streaks Q1 to Q3 are detected from the read image data respectively corresponding to the three sheets P1 to P3 which are continuously conveyed. On the sheets P1 to P3, an image having a density of 50% of black is formed as a test image.

Here, the distance in the sheet conveyance direction (sub-scanning direction) from the front end of the first sheet P1 to the streak Q1 is referred to as D1. Similarly, the distance in the sheet conveyance direction from the front end of the second sheet P2 to the streak Q2 is referred to as D2, and the distance in the sheet conveyance direction from the front end of the third sheet P3 to the streak Q3 is referred to as D3.

The sheet conveyance interval from the front end of the first sheet P1 to the front end of the second sheet P2 calculated from the output signal of the sheet detection sensor (first sheet detection sensor 71 or second sheet detection sensor 72) is referred to as E1, and the sheet conveyance interval from the front end of the second sheet P2 to the front end of the third sheet P3 is referred to as E2.

The distance (distance between streaks) F1 in the sheet conveyance direction of the streaks Q1 and Q2 is obtained from the following expression (1).

$$F1=E1+D2-D1 \tag{1}$$

The distance (distance between streaks) F2 in the sheet conveyance direction of the streaks Q1 and Q3 is obtained from the following expression (2).

$$F2=E1+E2+D3-D1 \tag{2}$$

By using the detection results of the sheet detection sensors 71 and 72 on the sheet conveyance path, it is possible to accurately calculate the interval between the streaks which were generated across the plurality of sheets P1 to P3.

If the distances between streaks F1 and F2 are integral multiples of the period corresponding to a candidate part which can be a cause of the streaks, the candidate part is estimated as the failure point. For example, in a case of determining whether the streaks Q1 to Q3 are generated at the intervals of period 251 mm corresponding to the photosensitive drums 41Y, 41M, 41C and 41K, whether the streaks Q2 and Q3 appear at the positions with distances of integral multiples of 251 mm from the streak Q1 appearing on the first sheet P1 is checked. If the distance F1 from the streak Q1 to the streak Q2 is 251 mm and the distance F2 from the streak Q1 to the streak Q3 is 502 mm, there is obtained an estimation result of a high possibility that the streaks are generated due to the failure of the photosensitive drums 41Y, 41M, 41C and 41K. In such a way, by checking whether the streaks are generated at the period of the part to be a candidate, it is possible to estimate the failure point.

As described above, according to the first embodiment, the sheet conveyance intervals are estimated on the basis of the detection results by the sheet detection sensors 71 and 72, and whether there is a specific periodicity is determined on the basis of the estimated conveyance intervals and the position in the sheet conveyance direction of the image abnormality detected from the read image data corresponding to each sheet. Thus, it is possible to determine the periodicity of image abnormalities without being influenced by the variance of the conveyance timing of the sheet.

For example, as for the streaky image abnormalities, detection is performed such that whether the streak is a colored streak or a white streak is distinguished, and whether there is a specific periodicity is determined on the basis of the positions of the colored streaks or the positions of the white streaks. Thus, it is possible to determine the periodicity by targeting the same type of streaks.

As for the spot-like image abnormalities, detection is performed such that whether the spot is a colored spot or a white spot is distinguished, and whether there is a specific periodicity is determined on the basis of the positions in the sheet conveyance direction of the colored spots or of the white spots which are located at the same position in the sheet width direction. Thus, it is possible to determine the periodicity by targeting the spot-like image abnormalities considered to have a same cause.

In the determination of periodicity corresponding to the parts regarding the processes of the charging, exposure, developing and transferring, it is possible to estimate the sheet conveyance intervals by using the detection results of the first sheet detection sensor 71 provided between the sheet feeder 50 and the secondary transfer position.

In the determination of periodicity corresponding to the parts included in the fixer 48, it is possible to estimate the sheet conveyance intervals by using the detection results of the second sheet detection sensor 72 provided right behind the fixer 48.

When the failure point is estimated, the estimated failure point is displayed on the display 20. Thus, it is possible to notify the estimated failure point to the user. This will be helpful when an operator or a serviceman performs maintenance of a failure part.

The failure part is exchanged when the serviceman performs maintenance in some cases, and thus, it is necessary to prepare the part of the exchange target. It is possible to promptly arrange the exchange unit for maintenance by uploading the information regarding the estimated failure point on the server.

For each of the plurality of parts which are candidates of the failure point, whether there is a periodicity corresponding to the part is determined. Thus, even in a case where a plurality of parts is failed in the image forming apparatus 100, it is possible to estimate every failure point.

[Second Embodiment]

Next, a second embodiment applying the preset invention will be described.

Since an image forming apparatus in the second embodiment have similar configurations to those of the image forming apparatus 100 shown in the first embodiment, the illustration and explanation of the configurations thereof are omitted by using FIGS. 1 and 2. Hereinafter, the configuration and processing characteristic to the second embodiment will be described.

In the second embodiment, the order of processing is determined in advance with respect to a plurality of parts which are candidates of the failure point. Specifically, here, the "candidate number" in the failure point candidate table T1 stored in the storage 82 is the processing order which was determined with respect to each part.

The controller 81 determines whether there is a periodicity corresponding to each of the plurality of the parts in accordance with the determined order, and ends the processing at the time when the controller 81 determines that there is a periodicity corresponding to any of the parts.

Next, the operation in the image forming apparatus in the second embodiment will be described.

Figure 10:
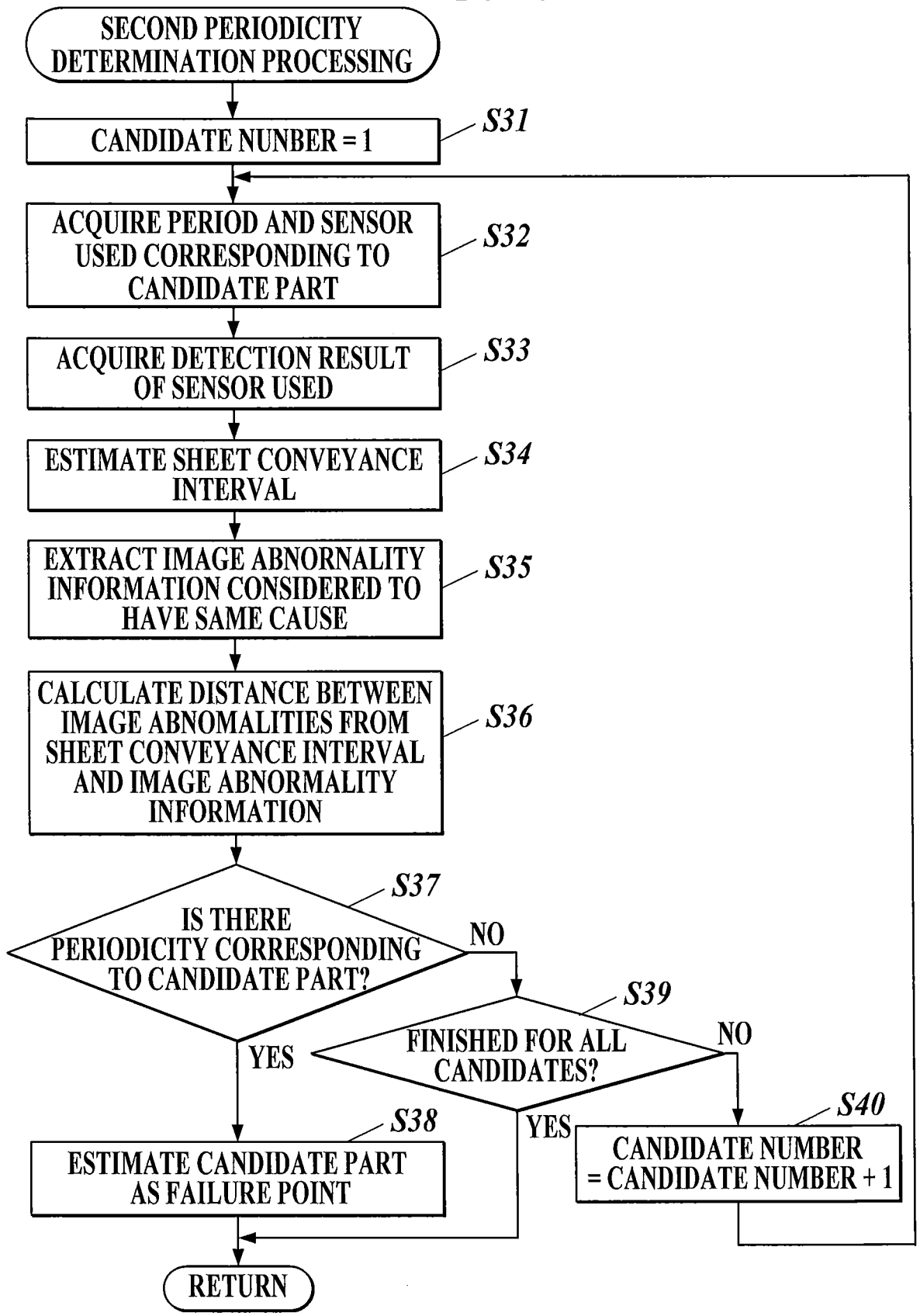
FIG. 10 is a flowchart showing second periodicity determination processing in a second embodiment of the present invention.

In the second embodiment, second periodicity determination processing shown in FIG. 10 is executed instead of the first periodicity determination processing (see FIG. 8) explained in the first embodiment. The processing excluding step S5 of the failure point estimation processing (see FIG. 6) and the image abnormality analysis processing (see FIG. 7) are similar to those of the first embodiment.

Figure 8:
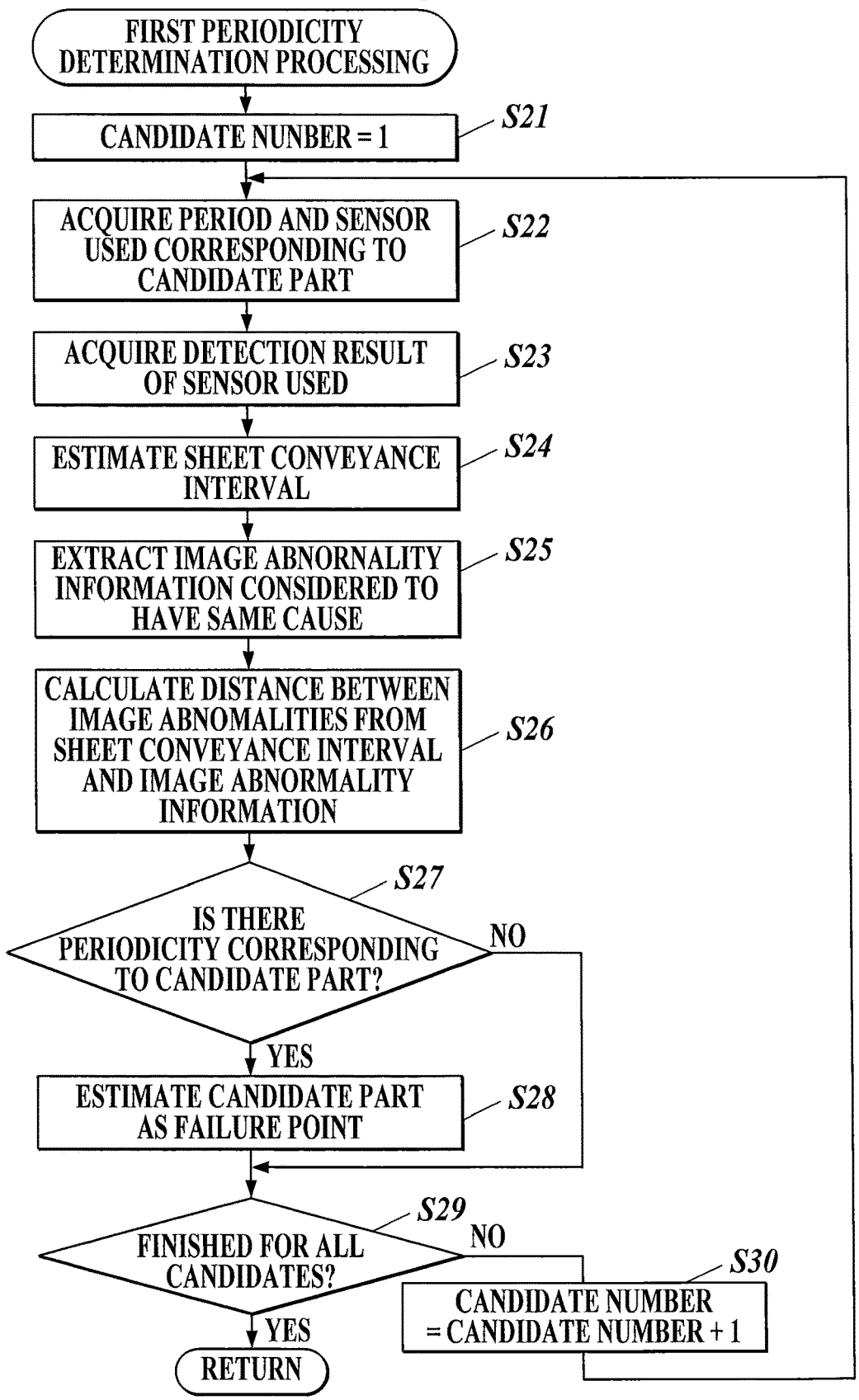
FIG. 8 is a flowchart showing first periodicity determination processing.

The processing in steps S31 to S36 of the second periodicity determination processing is similar to that of steps S21 to S26 of the first periodicity determination processing (see FIG. 8).

Next, the controller 81 determines whether there is a periodicity corresponding to the candidate part in generation of the image abnormalities on the basis of the distance between image abnormalities calculated in step S36 and the period corresponding to the candidate part obtained in step S32 (step S37).

If there is a periodicity corresponding to the candidate part in generation of the image abnormalities (step S37; YES), the controller 81 estimates the candidate part as a failure point (step S38).

In step S37, if there is no periodicity corresponding to the candidate part in generation of image abnormalities (step S37; NO), the controller 81 determines whether the processing is finished for all the failure point candidates (step S39).

If there is a failure point candidate for which the processing is not finished (step S39; NO), the controller 81 adds 1 to the candidate number (step S40), and returns to step S32. Then, the controller 81 repeats the processing for the next part as the periodicity determination target.

In step S39, if the processing is finished for all the failure point candidates (step S39; YES), or after step S38, the second periodicity determination processing ends.

In the second periodicity determination processing, for a part which is a candidate of the failure point, whether there is a periodicity of image abnormalities is determined in accordance with the order determined in advance, and the processing ends at the time when the failure points is estimated. For example, as shown in FIG. 3, when determining the periodicity in the order of "photosensitive drum", "developing sleeve" and the "fixing belt" as the failure point candidate, if it is detected that the image abnormalities are generated at the period of "photosensitive drum", the determination regarding periodicity with respect to the candidates in the later order is not performed, and the "photosensitive drum" is estimated as the failure point.

As described above, according to the second embodiment, similarly to the first embodiment, it is possible to determine the periodicity of the image abnormalities without being influenced by the variance of the conveyance timing of sheet.

Whether there is a periodicity corresponding to each of the plurality of parts is determined in accordance with the order determined in advance, and the processing ends at the time when it is determined that there is a periodicity corresponding to any of the parts. Thus, for example, by determining the periodicity in the order from the part with a higher frequency of failure, it is possible to shorten the time required for the processing.

The above description in each of the embodiments is an example of the image forming apparatus according to the present invention, and the present invention is not limited to this. As for the detailed configurations and detailed operations of components forming the apparatus can be modified as needed within the scope of the present invention.

For example, in the above each embodiment, both of the streaky image abnormalities and the spot-like image abnormalities are detected as the image abnormalities. However, one of them may be detected. The streaky image abnormalities or the spot-like image abnormalities which were detected may be classified by the color of yellow, magenta, cyan and black, or may be classified by the width of streak, the size of the spot-like dirt or the like. In this case, it is sufficient that the interval in the sheet conveyance direction is calculated for the image abnormalities which are matching each other in the color of image abnormality, the width of the streak, the size of the spot-like dirt or the like, and whether the interval matches the period corresponding to each part is determined.

In above each embodiment, the description was made for a case where a test image is used as a predetermined image formed for detecting the image abnormalities. However, the predetermined image may not be the test image. However, it is desirable that the image has a medium tone density formed by a toner of a single color for identifying the part causing the image abnormalities.

In the above ach embodiment, the description was made for a case of providing the image reader 60 on the sheet conveyance path. However, the image reading may be performed with a scanner of offline after the image formation. However, in consideration of the trouble of user, it is more preferable that the scanner provided on the sheet conveyance path is used as in the image reader 60 since it is possible to perform scanning automatically at the time of image formation.

The positions on the sheet conveyance path where the sheet detection sensors 71 and 72 are provided are merely examples, and the sheet detection sensors 71 and 72 may be provided at other positions. Specifically, on the sheet conveyance path, the sheet detection sensor may be provided near and downstream of the part causing the image abnormalities. By the detection results of the sheet detection sensor, it is possible to estimate the sheet conveyance intervals when the sheets are conveyed near the target part. For example, in a case where the image abnormalities occur at the period corresponding to a conveyance roller due to the dust or damage on the conveyance roller, the sheet conveyance intervals may be estimated by using the detection results of the sheet detection sensor provided near and downstream of the conveyance roller.

As a computer readable medium storing a program for executing each processing, a non-volatile memory such as a flash memory and a portable storage medium such as a CD-ROM may be used as well as the ROM. A carrier wave may also be applied as a medium for providing the program data via a communication line.

Although embodiments of the present invention have been described and illustrated in detail, the disclosed embodiments are made for purposes of illustration and example only and not limitation. The scope of the present invention should be interpreted by terms of the appended claims.

The entire disclosure of Japanese patent Application No. 2017-206757, filed on Oct. 26, 2017, is incorporated herein by reference in its entirety.

What is claimed is:

1. An image forming apparatus, comprising:
   an image former that forms a predetermined image on a plurality of sheets which are continuously conveyed;
   a first sheet detection sensor and a second sheet detection sensor that are provided on a sheet conveyance path and detect a passing timing of each of the plurality of sheets, the first sheet detection sensor being at a first location on the sheet conveyance path corresponding to a first portion of a plurality of parts of the image former, and the second sheet detection sensor being at a second location on the sheet conveyance path that is different from the first location and that corresponds to a second portion of the plurality of parts of the image former different from the first portion;
   an image reader that reads sheet surfaces of the plurality of sheets on which the predetermined image is formed, and that generates read image data corresponding to each of the sheets; and
   a hardware processor that:
   detects an image abnormality by analyzing the read image data and obtains a position in a sheet conveyance direction of the detected image abnormality in the read image data for each piece of the read image data corresponding to each of the sheets;
   estimates a conveyance interval of the plurality of sheets based on a detection result by one of the first sheet detection sensor and the second sheet detection sensor, the conveyance interval being estimated based upon the first location of the first sheet detection sensor or the second location of the second sheet detection sensor, and determines whether a specific periodicity exists based on the estimated conveyance interval and the position of the image abnormality detected from the read image data corresponding to each of the sheets; and
   when the specific periodicity is determined to exist, estimates a part of the plurality of parts corresponding to the specific periodicity as a failure point on the basis of which sensor among the first sheet detection sensor and the second sheet detection sensor determines a periodicity of image abnormalities that corresponds to the specific periodicity.

2. The image forming apparatus according to claim 1, wherein the hardware processor detects a streaky image abnormality along a sheet width direction orthogonal to the sheet conveyance direction from the read image data corresponding to each of the sheets.

3. The image forming apparatus according to claim 2, wherein
   the hardware processor distinguishes whether the streaky image abnormality is a colored streak having a density higher than a density of a surrounding portion or a white streak having a density lower than the density of the surrounding portion to detect the streaky image abnormality, and
   the hardware processor determines whether the specific periodicity exists based on positions of colored streaks or positions of white streaks.

4. The image forming apparatus according to claim 1, wherein the hardware processor detects a spot-like image abnormality from the read image data corresponding to each of the sheets, and obtains a position in a sheet width direction orthogonal to the sheet conveyance direction in addition to a position in the sheet conveyance direction of the detected spot-like image abnormality in the read image data.

5. The image forming apparatus according to claim 4, wherein
   the hardware processor distinguishes whether the spot-like image abnormality is a colored spot having a density higher than a density of a surrounding portion or a white spot having a density lower than the density of the surrounding portion to detect the spot-like image abnormality, and
   the hardware processor determines whether the specific periodicity exists based on positions in the sheet conveyance direction of colored spots or of white spots which are located at a same position in the sheet width direction.

6. The image forming apparatus according to claim 1, wherein
   the image former has parts relating to processes of charging, exposure, developing and transferring,
   the first sheet detection sensor is a sensor for determining an image creation timing in the processes of the charging, the exposure, the developing and the transferring, and the hardware processor estimates a part relating to the process of the charging, the exposure, the developing or the transferring as the failure point.

7. The image forming apparatus according to claim 1, wherein
the image former includes a fixer which fixes a toner image on the sheet,
the second sheet detection sensor is provided at a position near and downstream of the fixer on the sheet conveyance path, and
the hardware processor estimates a part included in the fixer as the failure point.

8. The image forming apparatus according to claim 1, wherein the hardware processor causes a display to display the estimated failure point.

9. The image forming apparatus according to claim 1, wherein the hardware processor uploads the estimated failure point to a server which is connected via a communication network, such that the estimated failure point is correlated with identification information of the image forming apparatus.

10. The image forming apparatus according to claim 1, wherein, for each of the plurality of parts which are candidates of the failure point, the hardware processor determines whether a periodicity corresponding to the part exists.

11. The image forming apparatus according to claim 1, wherein
an order of processing is determined in advance with respect to the plurality of parts which are candidates of the failure point, and
the hardware processor determines, in the determined order, whether a periodicity corresponding to each of the plurality of parts exists, and ends the processing when the hardware processor determines that the periodicity corresponding to any of the parts exists.

12. The image forming apparatus according to claim 1, wherein the predetermined image is a test image having a density of a predetermined medium tone.

13. A failure point estimation method comprising:
forming a predetermined image on a plurality of sheets which are continuously conveyed by an image former;
detecting a passing timing of each of the plurality of sheets by a first sheet detection sensor and a second sheet detection sensor that are provided on a sheet conveyance path, the first sheet detection sensor being at a first location on the sheet conveyance path corresponding to a first portion of a plurality of parts of the image former, and the second sheet detection sensor being at a second location on the sheet conveyance path that is different from the first location and that corresponds to a second portion of the plurality of parts of the image former different from the first portion;
reading sheet surfaces of the plurality of sheets on which the predetermined image is formed and generating read image data corresponding to each of the sheets by an image reader;
detecting an image abnormality by analyzing the read image data, and obtaining a position in a sheet conveyance direction of the detected image abnormality in the read image data, for each piece of the read image data corresponding to each of the sheets;
estimating a conveyance interval of the plurality of sheets based on a detection result by one of the first sheet detection sensor and the second sheet detection sensor, the conveyance interval being estimated based upon the first location of the first sheet detection sensor or the second location of the second sheet detection sensor, and determining whether a specific periodicity exists based on the estimated conveyance interval and the position of the image abnormality detected from the read image data corresponding to each of the sheets; and
when the specific periodicity is determined to exist, estimating a part of the plurality of parts corresponding to the specific periodicity as a failure point on the basis of which sensor among the first sheet detection sensor and the second sheet detection sensor determines a periodicity of image abnormalities that corresponds to the specific periodicity.

* * * * *